United States Patent [19]

Tanaka

[11] Patent Number: 5,756,198
[45] Date of Patent: May 26, 1998

[54] MAGNETIC RECORDING MEDIUM USING A DIMETHYLAMINO ALKYL ESTER ALKYLCARBOXYLATE LUBRICANT

[75] Inventor: Koichi Tanaka, deceased, late of Fukuoka, Japan, by Tatsuo Tanaka, administrator

[73] Assignee: Sony Corporation, Tokyo, Japan

[21] Appl. No.: 672,918

[22] Filed: Jun. 28, 1996

[30] Foreign Application Priority Data

Jun. 30, 1995 [JP] Japan ................... 7-165308

[51] Int. Cl.$^6$ ........................... G11B 5/71
[52] U.S. Cl. ............... 428/323; 428/341; 428/694 TP; 428/694 BP; 428/695; 428/900; 427/131
[58] Field of Search ............... 554/103; 428/694 TP, 428/695, 900, 694 BP, 323, 341; 427/131

[56] References Cited

U.S. PATENT DOCUMENTS

| | | | |
|---|---|---|---|
| 3,890,357 | 6/1975 | Rubin et al. | 260/404 |
| 4,324,739 | 4/1982 | Zondler et al. | 260/465.4 |
| 4,552,799 | 11/1985 | Ryoke et al. | 428/194 |

*Primary Examiner*—Stevan A. Resan
*Attorney, Agent, or Firm*—Hill & Simpson

[57] ABSTRACT

In a magnetic recording medium, dimethylamino alkylester alkylcarboxylate is held in a magnetic layer. This dimethylamino alkylester alkylcarboxylate has an excellent lubrication function under severe conditions such as a high-temperature and high-humidity condition or a low-temperature and low-humidity condition, and considerably reduces the friction coefficient of an object to be treated. The lubrication performance of dimethylamino alkylester alkylcarboxylate is sufficiently maintained even after dimethylamino alkylester alkylcarboxylate is held under the high-temperature and high-humidity condition, and is very stable. Therefore, when such dimethylamino alkylester alkylcarboxylate is held in, e.g., the magnetic layer of a magnetic recording medium, a magnetic recording medium which is excellent in abrasion resistance, durability, and travelling performance can be obtained.

7 Claims, No Drawings

MAGNETIC RECORDING MEDIUM USING A DIMETHYLAMINO ALKYL ESTER ALKYLCARBOXYLATE LUBRICANT

BACKGROUND OF THE INVENTION

1. Field of the Invention

The present invention relates a magnetic recording medium and, more particularly, to improvement on travelling performance, abrasion resistance, and durability.

2. Description of the Related Art

As a magnetic recording medium such as a magnetic tape or a magnetic disk, a so-called coating type magnetic recording medium in which a magnetic coating material prepared by dispersing and kneading a ferromagnetic powder, a binder, and various additives with an organic solvent is coated and dried on a non-magnetic support member to form a magnetic layer, or a so-called metal magnetic thin film type magnetic recording medium in which a ferromagnetic metal material is coated and formed on a non-magnetic support member by a method such as vapor deposition to form a magnetic layer is proposed.

Of these magnetic recording media, the metal magnetic thin film type magnetic recording medium has an extreme smoothness on the surface of the magnetic layer. For this reason, the substantial contact area with respect to a sliding member such as a magnetic head or a guide roller is large, and a friction coefficient becomes large. For this reason, an adhesion phenomenon (so-called sticking) between the magnetic layer and the sliding member easily occurs in travelling, the magnetic recording medium has a lack of travelling performance or durability. For example, when the magnetic recording medium is applied to an 8-mm video recording deck or a hard disk device, the following problem is posed.

A tape inserted in the 8-mm video recording deck is guided by 10 or more guide pins and wound on a head drum. A tape tension and a tape travelling speed at this time are kept constant by a pinch roller and a capstan. The tape tension and the travelling speed are generally set to be about 20 g and 0.5 cm/s, respectively.

In this case, in this travelling system, the magnetic layer side of the tape is designed to be in contact with the stainless-steel guide pin. In such a case, when the friction coefficient between the magnetic layer surface of the tape and the guide pin, the tape is stick-slipped, and a phenomenon called tape creaking occurs, and a reproduced image tends to be twitched.

The relative speed between the tape and the head is very high, and, especially in a pause state, the same portion on the tape is slid along the head at a high speed. Friction of the magnetic layer caused by the high-speed sliding or a decrease in reproduced output as a result of the friction are posed as problems. In the metal magnetic thin film type magnetic tape, such abrasion of the magnetic layer is very serious because the magnetic layer has a very small thickness.

In a hard disk device, a CSS (Contact Start Stop) scheme is generally employed. According to the CSS scheme, a magnetic head is in contact with a disk in a stop state of the disk. When the disk is rotated at a high speed in a starting state, the magnetic head is floated from the disk surface by an air flow generated by the high-speed rotation of the disk. In this state, recording and reproducing are performed. When the rotating speed of the disk is reduced in an operation stop state, thereby bringing the magnetic head into contact with the disk again. In such a CSS scheme, in a period of time from when the disk is started to be rotated to when the magnetic head is floated in a start state, in a period of time when the magnetic head is brought into contact with the disk to the disk is rotated in an operation start state, the magnetic head is slid on the disk. The friction between the magnetic head and the disk poses a serious problem. In order to keep reliability at a merchant level, a friction coefficient is preferably set to be 0.5 or less after a CSS operation is repeated 20,000 times. However, in the metal magnetic thin film type magnetic disk having high surface smoothness, this condition cannot be easily satisfied. In addition, head crash or the like caused by collision between the head and the disk is a problem to be solved.

In order to solve the above problems, various lubricants such as a higher fatty acid or an ester thereof is tried to be top-coated on a magnetic layer or contains in the magnetic layer to suppress a friction coefficient. However, the lubricant used in the magnetic recording medium used in the magnetic recording medium requires the following severe conditions, and a proper lubricant cannot be found.

More specifically, the lubricant used in the magnetic recording medium requires the following conditions:

(1) Low-temperature characteristics are excellent to assure a predetermined lubrication effect in use of the lubricant in a cold place.

(2) The lubricant can be coated into a very thin film because the spacing between the lubricant and a magnetic head is posed as a problem. In this case, sufficient lubrication performance can also be obtained.

(3) The lubricant can be used for a long period of time, and the lubrication effect can be kept for a long period of time.

More specifically, as a lubricant for a magnetic recording medium, a lubricant which has excellent lubricant performance, which can be in uniform and tight contact with the surface of the magnetic layer, whose lubrication performance can be kept for a long period of time, e.g., 10 years or more, and which can be coated as a thin film having an almost monomolecular level of several nm is ideally used.

As a lubricant, a large number of compounds have been proposed. These compounds can be roughly classified into three types of compounds, i.e., a silicon-based compound, a hydrocarbon-based compound, and a fluorine-based compound.

A silicon-based lubricant is one of lubricants which are popularly used in a coating type magnetic recording medium because of good thermal stability and a low vapor pressure. However, when the lubricant is used in a metal magnetic thin film type magnetic recording medium having good smoothness, since the silicon-based lubricant has sufficient lubrication performance, the specification of durability in an abrasion acceleration test of a pin-on disk or a CSS test is not satisfied. That is, the silicon-based lubricant cannot easily satisfy the lubricant characteristics required in a thin film type magnetic recording medium which is popularly used recently.

The hydrocarbon-based lubricant is popularly used in a coating type magnetic recording medium recently. However, the hydrocarbon-based lubricant is inferior to a carbon-fluoride-based lubricant in thermal or chemical stability. For this reason, the lubricant molecules react with each other by friction to generate frictional polymer. This frictional polymer degrades lubrication characteristics, or occasionally causes a serious failure. It is very troublesome. The hydrocarbon-based lubricant has a high vapor pressure as one of drawbacks. More specifically, although the hydrocarbon-based lubricant exhibits excellent friction characteristics, the hydrocarbon-based lubricant gradually volatilizes because of a high vapor pressure. For this reason, in a metal magnetic thin film type magnetic recording medium which is held by top-coating a lubricant on the surface, when the lubricant volatilizes from the surface, the lubricant is not supplemented. For this reason, lubrication performance cannot be easily maintained.

The fluorine-based lubricant is a lubricant which is most popularly used in a metal magnetic thin film type magnetic recording medium. Of fluorine-based lubricants, perfluoropolyether is popularly used above all because perfluoropolyether is better than another fluorine-based lubricant in lubrication performance or a surface protecting function. Perfluoropolyether has good characteristics for the following reason. That is, perfluoropolyether has viscosity lower than that of perfluoroalkane having a molecular weight equal to that of perfluoropolyether because $CF_2$—O—$CF_2$ ether linkage is flexible, and the viscosity does not change in a wide temperature range. In addition, perfluoropolyether has the following characteristic features. That is, perfluoropolyether is chemically inactive and has a low vapor pressure, high thermal or chemical stability, a low surface energy, good boundary lubrication characteristics, high water-repellency, and the like.

In this case, the characteristics of perfluoropolyether strongly depend on its molecular structure. Although several types of perfluoropolyethers can be available as merchant products, these perfluoropolyethers respectively have different molecular weights, different repeating units of main chains, and different end groups.

For example, Fomblin-Y (trade name, available from Montedison) is a random copolymer of $CF(CF_3)CF_2O$ and $CF_2O$, and has a repeating unit of a main chain which has a branch structure. In contrast to this, Fomblin-Z (trade name, available from Montedison) is a homopolymer of $CF_2CF_2O$ and $CF_2O$, and has a straight chain structure. Demnum (trade name, available from Daikin Industries, Ltd.) and Krytox (trade name, available from du Pont) are homopolymers between hexafluoro propylene oxide and hexafluoro isopropylene oxide.

However, since perfluoropolyether is non-polar, perfluoropolyether disadvantageously has a lack of adsorption performance on the magnetic recording medium. In a metal magnetic thin film type magnetic recording medium which is held by coating a lubricant on a magnetic layer, the lack of adsorption performance is a drawback. Therefore, in order to improve adsorption performance, as perfluoropolyether having polar groups at both the ends, Fomblin Z-DOL (trade name, available from Montedison) (having a hydroxyl group as a polar group) or Fomblin AM2001 (trade name, available from Montedison) (having a piperonylic group as a polar group) has been developed. Perfluoropolyether having the above polar group has a very strong fixing function to a metal surface or a carbon surface. When the perfluoropolyether is used as a lubricant, the perfluoropolyether is better than an unmodified perfluoropolyether in reduction in friction coefficient, and a long service life can be obtained.

As described above, perfluoropolyether is variously modified to improve its lubrication performance. However, perfluoropolyether still has problems to be solved.

One of the problems is decomposition caused by friction of perfluoropolyether between a medium and a magnetic head.

More specifically, in some magnetic recording system, the relative speed between the medium and the magnetic head exceeds several meters. The temperature of the medium surface may suddenly, instantaneously increase due to frictional heat generated by the contact portion. Although a method of accurately measuring the temperature of the contact portion has not been established, it is estimated that the calculation value of the temperature exceeds several hundreds degrees Celsius. In particular, under a boundary lubrication condition as in a magnetic recording system, a reactive surface is exposed to the sliding portion. For this reason, the reactive surface enhances the decomposition reaction of lubricant molecules with an increase in temperature at the contact point.

In this case, although perfluoropolyether is stable at a temperature of 350° C. or more, decomposition of perfluoropolyether is enhanced in the presence of Lewis acids or Lewis bases such as $AlCl_3$, $FeF_3$, and $Al_2O_3$. Such decomposition of a lubricant not only adversely affects the lubrication characteristics, but also degrades the reliability of the magnetic recording system.

Since perfluoropolyether can be solved in only a fluorine-based solvent such as a flon gas, it poses problems in the ecology of the earth.

As a countermeasure against the problems, a perfluoropolyether-based lubricant (can be solved in a hydrocarbon-based solvent) obtained by applying perfluoropolyether groups to long-chain alkylesters or an amine compound (can be solved in an alcohol-based solvent) of perfluoropolyether having a carboxyl group at its end is reported. However, although such a lubricant having an ester group is excellent in still durability, the friction coefficient of the lubricant tends to increase. Therefore, the lubricant is not a satisfactory lubricant.

As described above, the lubricant used in a magnetic recording medium requires various conditions related to not only lubrication performance, but also thermal or chemical stability, adsorption to the medium surface, the types of solvents. A lubricant which can completely satisfy the conditions is not realized at present.

SUMMARY OF THE INVENTION

The present invention has been proposed in consideration of the above conventional circumstances, and has as its object to provide a lubricant which can have excellent lubrication performance for a long period of time under various using conditions. It is another object of the present invention to provide a magnetic recording medium which is excellent in travelling performance, abrasion resistance, and durability and which is obtained using the lubricant.

In order to achieve the above objects, the present inventors examined an ester-based lubricant with respect to a method of decreasing a friction coefficient. As a result, the present inventors knew that dimethylamino alkylester alkylcarboxylate is a lubricant which satisfied the above conditions.

The present invention is completed on the basis of the above knowledge. More specifically, according to the present invention, there is provided a lubricant characterized in that the lubricant is dimethylamino alkylester alkylcarboxylate represented by the formula I:

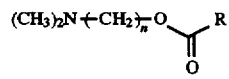

where R is a hydrocarbon group having a carbon number of not less than 11, and n is an integer not more than 10.

According to the present invention, there is a magnetic recording medium having at least a magnetic layer formed on a non-magnetic support member, characterized in that the dimethylamino alkylester alkylcarboxylate represented by the formula I is held on the magnetic layer.

The lubricant according to the present invention is the dimethylamino alkylester alkylcarboxylate represented by the formula I. The dimethylamino alkylester alkylcarboxylate is synthesized by the following manner.

More specifically, a mixture of dimethylamino alcohol, carbonic acid, and small-excessive p-toluenesulfonic acid is heated and subjected to reflux while moisture is removed in toluene anhydride by azeotropy. As a result, dimethylamino alcohol and carbonic acid are ester-bonded to each other, p-toluenesulfonate which is an ester of dimethylamino alcohol and carbonic acid can be obtained. The carbon number of the carbon chain in dimethylamino alcohol used in this case corresponds to a carbon number n of dimethylamino alkylester alkylcarboxylate which is finally obtained, the hydrocarbon group of carbonic acid corresponds to a hydrocarbon group R of dimethylamino alkylester alkylcarboxylate which is finally obtained. Therefore, dimethylamino alcohol and carbonic acid are selected in accordance with the desired hydrocarbon group R and carbon number n.

After the reaction mixture is cooled in the air and treated with an alkaline aqueous solution to generate a free ester, thereby synthesizing dimethylamino alkylester alkylcarboxylate which is the object of the present invention.

The dimethylamino alkylester alkylcarboxylate has an excellent lubrication function under severe conditions such as a high-temperature and high-humidity condition or a low-temperature and low-humidity condition, and considerably reduces the friction coefficient of an object to be treated. This lubrication performance is very stable, and is maintained for a long period of time. Therefore, when such dimethylamino alkylester alkylcarboxylate is held in, e.g., the magnetic layer of a magnetic recording medium, the abrasion resistance, durability, and, especially, travelling performance of the magnetic recording medium are considerably improved.

In such dimethylamino alkylester alkylcarboxylate, the carbon number of the hydrocarbon group R is limited to 11 or more. When the carbon number of the hydrocarbon group R is smaller than 11, lubrication performance degrades. However, since the lubrication performance of dimethylamino alkylester alkylcarboxylate is saturated when the carbon number of the hydrocarbon group R becomes about 18, the actual upper limit of the carbon number of the hydrocarbon group R is 20.

The carbon number of the carbon chain of dimethylamino alkylester alkylcarboxylate is limited to 10 or less. This limit is determined for synthesis. It is difficult to synthesize dimethylamino alkylester alkylcarboxylate having a carbon number n of 11 or more for various reasons. Note that dimethylamino alkylester alkylcarboxylate having a carbon number n of 2 to 4 can be more easily synthesized.

Such dimethylamino alkylester alkylcarboxylate is used as a lubricant for, e.g., a magnetic recording medium.

A magnetic recording medium to which this dimethylamino alkylester alkylcarboxylate is applied may be a metal magnetic thin film type magnetic recording medium in which a magnetic layer is formed by adhering and forming a ferromagnetic metal material on a non-magnetic support member by a vacuum thin film formation technique. The dimethylamino alkylester alkylcarboxylate may also be applied to a coating type magnetic recording medium in which a magnetic layer is formed by coating and drying a magnetic coating material prepared by dispersing and kneading a ferromagnetic powder, a binder, various additives, and an organic solvent.

In the metal magnetic thin film type magnetic recording medium, as a non-magnetic support member, for example, polyesters such as polyethylene terephthalate, polyolefins such as polyethylene or polypropylene, a cellulose derivative such as cellulose triacetate, cellulose diacetate, or cellulose butylate, a vinyl-based resin such as polyvinyl chloride or polyvinylidene chloride, a polymer material such as polycarbonate, polyimide, or polyamide, a light metal such as an aluminum alloy or a titanium alloy, or a ceramic such as alumina glass is available. When a substrate such as an aluminum alloy plate or a glass plate having rigidity is used as the non-magnetic support member, an anodized aluminum film, an Ni—P film, or the like may be formed on the substrate surface to harden the surface.

As the metal magnetic thin film, for example, an in-plane magnetic recording type metal magnetic thin film consisting of a metal such as Fe, Co, or Ni, a Co—Ni alloy, a Co—Pt alloy, a Co—Pt—Ni alloy, an Fe—Co alloy, an Fe—Ni alloy, an Fe—Co—Ni alloy, an Fe—Ni—B alloy, an Fe—Co—B alloy, an Fe—Co—Ni—B alloy, or the like, or a vertical magnetic recording type metal magnetic thin film consisting of a Co—Cr alloy or the like is used.

When the in-plane magnetic recording type metal magnetic thin film is used, an underlying layer consisting of a low-melting-point non-magnetic material such as Bi, Sb, Pb, Sn, Ga, In, Ge, Si, or Ti is formed on a non-magnetic support member, and a metal magnetic material is vertically deposited or sputtered on the underlying layer to preferably form a metal magnetic thin film. When the metal magnetic material is deposited on the underlying layer, the low-melting-point non-magnetic material of the underlying layer is diffused in the metal magnetic thin film, and the orientation of the metal magnetic thin film is eliminated, thereby assuring an in-plane isotropy and improving antimagnetic properties.

In order to hold the dimethylamino alkylester alkylcarboxylate on the metal magnetic thin film described above, the dimethylamino alkylester alkylcarboxylate is dissolved in a solvent to prepare a lubricant coating material, and the lubricant coating material is top-coated on the metal magnetic thin film. At this time, an amount of coating of dimethylamino alkylester alkylcarboxylate is preferably set to be 0.5 to 100 mg/m$^2$, more preferably, 1 to 20 mg/m$^2$.

When the magnetic recording medium is used as a hard disk, a hard protective film such as a graphite-like, diamond-like, or amorphous carbon film, a chromium oxide film, an $SiO_2$ film, or a $ZrO_2$ may be formed on the surface of the metal magnetic thin film. However, when such a protective film is formed, dimethylamino alkylester alkylcarboxylate is held on the protective film in place of a metal magnetic thin film. In this case, dimethylamino alkylester alkylcarboxylate is dissolved in a hydrocarbon-based solvent to prepare a lubrication coating material, and the lubrication coating material is preferably top-coated on the protective film. An amount of coating may be equal to that in the case wherein the coating material is held on the metal magnetic thin film.

In the coating type magnetic recording medium, as a non-magnetic support member, the non-magnetic support member shown in the case wherein the metal magnetic thin film type magnetic recording medium is used can be used.

As the ferromagnetic powder included in the magnetic layer, an oxide magnetic powder or a metal magnetic powder may be used. As the oxide magnetic powder, $\gamma$—$Fe_2O_3$, Co-containing $\gamma$—$Fe_2O_3$, $Fe_3O_4$, Co-containing $\gamma$—$Fe_3O_4$, Co-adhering $Fe_3O_4$, or $CrO_2$ is available. As the metal magnetic powder, Fe, Co, Ni, Fe—Co, Fe—Ni, Fe—Co—Ni, Co—Ni, Fe—Co—B, Fe—Co—Cr—B, Mn—Bi, Mn—Al, Fe—Co—V, or the like is available. In addition, in order to improve the various characteristics, a metal component such as Al, Si, Ti, Cr, Mn, Cu, Zn, or the like may be added. Hexagonal system ferrite such as barium ferrite, iron nitride, or the like may also be used.

As a binder, an organic binder such as a vinyl-based copolymer, polyester polyurethane, polycarbonate polyurethane, or nitrocellulose can be used.

In order to hold the dimethylamino alkylester alkylcarboxylate on the magnetic layer described above, a lubrication coating material consisting of dimethylamino alkylester alkylcarboxylate is prepared as described above, and the lubrication coating material may be top-coated on the magnetic layer, or dimethylamino alkylester alkylcarboxylate may be directly added to the magnetic layer. In order to add dimethylamino alkylester alkylcarboxylate to the magnetic layer, when a magnetic coating material is prepared, the dimethylamino alkylester alkylcarboxylate may be mixed with other coating components. At this time, the ratio of the lubricant is properly set to be 0.5 to 20 weight ratio with respect to 100 weight ratio of the binder.

In the coating type magnetic layer, in addition to dimethylamino alkylester alkylcarboxylate, an additive ordinarily used in the magnetic recording medium of this type, e.g., an abrasive, antistatic agent, or the like may be added.

As described above, according to the present invention, dimethylamino alkylester alkylcarboxylate is held on the magnetic layer. The dimethylamino alkylester alkylcarboxylate may be singly used, or may be combined to a known lubricant conventionally used in a magnetic recording medium.

In addition, the dimethylamino alkylester alkylcarboxylate may be used together with an extreme pressure agent such that its lubrication effect is maintained under more severe conditions.

The extreme pressure agent reacts with a metal surface by friction heat generated when partial metal contact occurs in a boundary lubrication area to form a reaction product film. This reaction product film prevents friction or abrasion. As the extreme pressure agent, a fluorine-based extreme pressure agent, a sulfur-based extreme pressure agent, a halogen-based extreme pressure agent, an organic-metal-based extreme pressure agent, a composite extreme pressure agent, or the like can be used. Note that the compounding ratio between the lubricant and the extreme pressure agent is properly set to be about 30:70 to 70:30 (weight ratio).

A rust preventive can also be used.

As the rust preventive, any agents used in the magnetic recording medium of this type can be used. For example, phenoles, naphthols, quinones, nitrogen-atom-containing heterocyclic compounds, oxygen-atom-containing heterocyclic compounds, sulfur-atom-containing heterocyclic compounds, or the like are available as the rust preventive.

Although the basic composition of the magnetic recording medium to which the dimethylamino alkylester alkylcarboxylate is applied is described above, the composition of the medium is not limited to the composition described above. The magnetic recording medium may have an additive element which is ordinarily employed to improve characteristics without any problem.

For example, a back-coating layer may be formed on a surface of a non-magnetic support member opposing the surface on which the magnetic layer of the non-magnetic support member is formed, or an underlying layer may be formed on the lower side of the magnetic layer to control the surface properties of the magnetic layer.

The back-coating layer is a layer obtained by dispersing a carbon-based powder for giving conductivity to the resin binder shown in the magnetic coating film or an inorganic pigment for controlling surface roughness. The back-coating layer is formed to improve the travelling performance of the medium. Note that the dimethylamino alkylester alkylcarboxylate may be added or top-coated on the back-coating layer to hold the back-coating layer. For this reason, travelling performance can be more improved.

Dimethylamino alkylester alkylcarboxylate has an excellent lubrication function under severe conditions such as a high-temperature and high-humidity condition or a low-temperature and low-humidity condition, and considerably reduces the friction coefficient of an object to be treated. This lubrication performance is very stable, and is maintained for a long period of time. Therefore, when such dimethylamino alkylester alkylcarboxylate is held in, e.g., the magnetic layer of a magnetic recording medium, the abrasion resistance, durability, and, especially, travelling performance of the magnetic recording medium are considerably improved.

DETAILED DESCRIPTION OF THE PREFERRED EMBODIMENT

An embodiment of the present invention will be described below. The present invention is not limited to this embodiment as a matter of course.

A lubricant used in this embodiment is represented by the formula I. The lubricant is dimethylamino alkylester alkylcarboxylate having a hydrocarbon group R shown in Table and a carbon number n shown in Table 1.

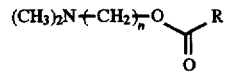

where R is a hydrocarbon group having a carbon number of not less than 11, and n is an integer not more than 10

TABLE 1

| Compound | R | n |
|---|---|---|
| (1) | n-$C_{11}H_{23}$ | 3 |
| (2) | n-$C_{13}H_{27}$ | 3 |
| (3) | n-$C_{15}H_{31}$ | 3 |
| (4) | n-$C_{17}H_{35}$ | 3 |
| (5) | n-$C_{11}H_{23}$ | 2 |
| (6) | n-$C_{17}H_{35}$ | 2 |
| (7) | n-$C_{11}H_{23}$ | 4 |
| (8) | n-$C_{17}H_{35}$ | 4 |

In this embodiment, magnetic tapes each using the dimethylamino alkylester alkylcarboxylate (Compound 1 to Compound 8) as a lubricant were manufactured, and the characteristics of the magnetic tapes are evaluated.

EXAMPLE 1

Cobalt was adhered to a polyethylene terephthalate film having a thickness of 10 µm by an oblique deposition method to form a metal magnetic thin film having a thickness of 200 nm.

A lubricant coating material obtained by dissolving Compound 1 in hexane was coated on the surface of the metal magnetic thin film, and was cut to have a width of 8 mm, thereby manufacturing a sample tape. Note that an amount of coating of dimethylamino alkylester alkylcarboxylate was set to be 5 mg/m$^2$.

EXAMPLE 2 TO EXAMPLE 8

In Example 2 to Example 8, sample tapes were manufactured under the same conditions as those of Example 1 except that Compound 2 to Compound 8 were used as lubricants in place of Compound 1.

COMPARATIVE EXAMPLE 1

A sample tape was manufactured under the same conditions as those of Example 1 except that perfluoropolyether (trade name: Fomblin Z-DOL available from Montedison) having a hydroxyl group at an end was used as a lubricant in place of Compound 1.

COMPARATIVE EXAMPLE 2

A sample tape was manufactured under the same conditions as those of Example 1 except that perfluoropolyether (trade name: Fomblin Z-DIAC available from Montedison) having a carboxyl group at an end was used as a lubricant in place of Compound 1.

COMPARATIVE EXAMPLE 3

A sample tape was manufactured under the same conditions as those of Example 1 except that cetylester stearate was used as a lubricant in place of Compound 1.

COMPARATIVE EXAMPLE 4

A sample tape was manufactured under the same conditions as those of Example 1 except that dimethylaminopropyle ester capric was used as a lubricant in place of Compound 1.

The sample tapes of Example 1 to Example 8 and Comparative Example 1 to Comparative Example 4 were examined for dynamic friction coefficient, still durability, and shuttle durability under the conditions: (1) at a temperature of 25° C. and a relative humidity of 60%; (2) at a temperature of 40° C. and a relative humidity of 80%; and (3) at a temperature of −5° C.

Measurement of Dynamic Friction Coefficient

Each of the sample tape was travelled at a rate of 5 mm/second under an applied load of 50 g/8 mm along a guide roller made of stainless steel (SUS304) and having a surface roughness of 0.2s and an outer diameter of 4 mm to measure a dynamic friction coefficient thereof. This tape travelling conditions approximately simulated those in actual video tape recorders (VTR).

Measurement of Still Durability

The still durability was determined by measuring a time required to attenuate an output in a pause mode to −3 dB. Each sample tape was loaded in a video deck (8 mm-VTR/EV-S55 manufactured by Sony Corp.) and subjected to still travelling to measure a still durability therefor. In the measurement, "color-bar" image signal was used as a measuring signal while RF signal was used as an output signal.

Measurement of Shuttle Durability

Each sample tape was loaded in a video deck (8 mm-VTR/EV-S55 manufactured by Sony Corp.) and reciprocatively travelled at a rate of 2 minutes per cycle. Here, one cycle was prescribed as involving one forward and one reverse travelling strokes. The shuttle durability was determined by counting the number of cycles required until the output is decreased by 3 dB. In the measurement, "color-bar" image signal was used as a measuring signal while RF signal was used as an output signal.

The results are shown in Table 2 and Table 3.

TABLE 2

| | Condition | Dynamic Friction Coefficient | Still Durability (minutes) | Shuttle Durability (times) |
|---|---|---|---|---|
| Example 1 | 25° C., 60% RH | 0.23 | >120 | >150 |
| | 40° C., 80% RH | 0.25 | >120 | >150 |
| | −5° C. | 0.23 | >120 | >150 |
| Example 2 | 25° C., 60% RH | 0.22 | >120 | >150 |
| | 40° C., 80% RH | 0.25 | >120 | >150 |
| | −5° C. | 0.23 | >120 | >150 |
| Example 3 | 25° C., 60% RH | 0.20 | >120 | >150 |
| | 40° C., 80% RH | 0.23 | >120 | >150 |
| | −5° C. | 0.20 | >120 | >150 |
| Example 4 | 25° C., 60% RH | 0.24 | >120 | >150 |
| | 40° C., 80% RH | 0.27 | >120 | >150 |
| | −5° C. | 0.25 | >120 | >150 |
| Example 5 | 25° C., 60% RH | 0.23 | >120 | >150 |
| | 40° C., 80% RH | 0.25 | >120 | >150 |
| | −5° C. | 0.23 | >120 | >150 |
| Example 6 | 25° C., 60% RH | 0.22 | >120 | >150 |
| | 40° C., 80% RH | 0.26 | >120 | >150 |
| | −5° C. | 0.25 | >120 | >150 |
| Example 7 | 25° C., 60% RH | 0.24 | >120 | >150 |
| | 40° C., 80% RH | 0.27 | >120 | >150 |
| | −5° C. | 0.25 | >120 | >150 |
| Example 8 | 25° C., 60% RH | 0.22 | >120 | >150 |
| | 40° C., 80% RH | 0.26 | >120 | >150 |
| | −5° C. | 0.22 | >120 | >150 |

TABLE 3

| | Condition | Dynamic Friction Coefficient | Still Durability (minutes) | Shuttle Durability (times) |
|---|---|---|---|---|
| Comparative Example 1 | 25° C., 60% RH | 0.32 | >120 | >150 |
| | 40° C., 80% RH | 0.41 | 78 | 98 |
| | −5° C. | 0.31 | 65 | 79 |
| Comparative Example 2 | 25° C., 60% RH | 0.32 | >120 | >150 |
| | 40° C., 80% RH | 0.44 | 58 | 78 |
| | −5° C. | 0.33 | 64 | 85 |
| Comparative Example 3 | 25° C., 60% RH | 0.22 | 100 | 68 |
| | 40° C., 80% RH | 0.32 | 82 | 91 |
| | −5° C. | 0.25 | 60 | 50 |
| Comparative Example 4 | 25° C., 60% RH | 0.25 | >120 | 133 |
| | 40° C., 80% RH | 0.27 | 115 | 125 |
| | −5° C. | 0.25 | 101 | 117 |

As shown in Table 2, the sample tapes of Example 1 to Example 8 each of which uses dimethylamino alkylester alkylcarboxylate as a lubricant have small dynamic friction coefficient and excellent durability.

As shown in Table 3, the sample tapes of Comparative Example 1 to Comparative Example 3 each of which uses a compound different from dimethylamino alkylester alkylcarboxylate as a lubricant have poor durability under the conditions, i.e., a temperature of 40° C. and a relative humidity of 80%, and a temperature of −5° C.

Even if dimethylamino alkylester alkylcarboxylate is used, the sample tape of Comparative Example 4 using, as a lubricant, a compound in which the carbon number of R of an alkylcarboxylate portion is smaller than 11 is used has durability under the conditions, i.e., a temperature of 40° C. and a relative humidity of 80%, and a temperature of −5° C.

For this reason, it was found that dimethylamino alkylester alkylcarboxylate having a predetermined carbon number has lubrication performance better than that of another lubricant.

EXAMPLE 9

Magnetic coating material components were measured in accordance with the following compositions, and these components were mixed with each other for 24 hours.

Composition of Magnetic Coating Material

| | |
|---|---|
| Metal magnetic powder | 100 weight ratio |
| Vinyl chloride-vinyl acetate copolymer | 10.5 weight ratio |
| Polyurethane resin | 10.5 weight ratio |
| Carbon (antistatic agent) | 5 weight ratio |
| Methyl ethyl ketone | 150 weight ratio |
| Cyclohexane | 150 weight ratio |

After the resultant mixture was filtered by a filter, 4 weight ratio of Colonate L (trade name: Polyisocianate, available from Nihon Polyurethane) were added to the filtered mixture. The mixture was stirred for 30 minutes to prepare a magnetic coating material.

This magnetic coating material was coated on a polyethylene telephthalate base having a thickness of 12 μm such that the dried magnetic coating material had a thickness of 2 μm, and the resultant structure was subjected to a magnetic orientation process with keeping the magnetic coating material wet. After the film was dried, the resultant structure was wound and calendared. A lubricant coating material obtained by dissolving Compound 1 in hexane was coated on the magnetic layer, and cut to have a width of 8 mm, thereby manufacturing a sample tape. An amount of coating of the lubricant was set to be 5 mg/m².

EXAMPLE 10 TO EXAMPLE 16

In Example 10 to Example 16, sample tapes were manufactured under the same conditions as those of Example 9 except that Compound 2 to Compound 8 were used as lubricants in place of Compound 1.

COMPARATIVE EXAMPLE 5

A sample tape was manufactured under the same conditions as those of Example 9 except that Fomblin Z-DOL was used as a lubricant in place of Compound 1.

COMPARATIVE EXAMPLE 6

A sample tape was manufactured under the same conditions as those of Example 9 except that Fomblin Z-DIAC was used as a lubricant in place of Compound 1.

COMPARATIVE EXAMPLE 7

A sample tape was manufactured under the same conditions as those of Example 9 except that cetylester stearate was used as a lubricant in place of Compound 1.

COMPARATIVE EXAMPLE 8

A sample tape was manufactured under the same conditions as those of Example 1 except that dimethylaminopropyle ester capric was used as a lubricant in place of Compound 1.

The sample tapes of Example 9 to Example 16 and Comparative Example 5 to Comparative Example 8 manufactured as described above were held for seven days (aging) under the condition, i.e., a temperature of 40° C. and a relative humidity of 80%, and the dynamic friction coefficients of the sample tapes and the generation states of stick slip and dropout of the sample tapes were examined under the condition, i.e., a temperature of 25° C. and a relative humidity of 60%, after and before aging. Measurement results obtained before aging are shown in Table 4, and measurement results obtained after aging are shown in Table 5.

The stick slip was checked by checking, as an index, whether a static friction coefficient in a friction state exceeds 0.6. The measurement of the static coefficient was performed under the same conditions as described in the measurement of the dynamic friction coefficient above. The static coefficient was determined as a maximum value obtained within 100 ms at an initial stage of the measurement. A case wherein the static friction coefficient exceeds 0.6 was recorded as "x", and a case wherein the static friction coefficient does not exceed 0.6 was recorded as "O".

The dropout was evaluated in such a manner that a sample tape was continuously travelled for 3 minutes at a tape relative velocity of 3.80 m/sec. at f=7 MHz, and, at this time, the number of times of a 1-μsec decrease in output of −9 dB or more was measured. Incidentally, the measurement was performed by using a video signal containing 50% white.

TABLE 4

| | Durability Before Aging | | |
|---|---|---|---|
| | Dynamic Friction Coefficient | Stick Slip | Dropout |
| Example 9 | 0.22 | 0 | 71 |
| Example 10 | 0.24 | 0 | 69 |
| Example 11 | 0.24 | 0 | 81 |
| Example 12 | 0.22 | 0 | 70 |
| Example 13 | 0.23 | 0 | 77 |
| Example 14 | 0.23 | 0 | 68 |
| Example 15 | 0.25 | 0 | 73 |
| Example 16 | 0.22 | 0 | 65 |
| Comparative Example 5 | 0.35 | 0 | 89 |
| Comparative Example 6 | 0.33 | 0 | 120 |
| Comparative Example 7 | 0.23 | 0 | 123 |
| Comparative Example 8 | 0.26 | 0 | 96 |

TABLE 5

| Example NO. | Durability After Aging | | |
|---|---|---|---|
| | Dynamic Friction Coefficient | Stick Slip | Dropout |
| Example 9 | 0.22 | 0 | 90 |
| Example 10 | 0.26 | 0 | 89 |
| Example 11 | 0.24 | 0 | 98 |
| Example 12 | 0.24 | 0 | 85 |
| Example 13 | 0.26 | 0 | 93 |
| Example 14 | 0.27 | 0 | 85 |
| Example 15 | 0.26 | 0 | 82 |
| Example 16 | 0.23 | 0 | 79 |
| Comparative Example 5 | 0.30 | x | 99 |
| Comparative Example 6 | 0.33 | x | 120 |
| Comparative Example 7 | 0.32 | x | 143 |
| Comparative Example 8 | 0.31 | Δ | 110 |

As shown in Table 4 and Table 5, in the sample tapes of Example 9 to Example 16 each using dimethylamino alkylester alkylcarboxylate as a lubricant, the friction coefficients obtained before aging are kept after aging, and the number of times of occurrence of stick slip and dropout can be suppressed to be small by keeping the friction coefficients constant. In contrast to this, the sample tapes of Comparative Example 5 to Comparative Example 7 using compounds different from dimethylamino alkylester alkylcarboxylate as lubricants and the sample tape of Comparative Example 8 using dimethylamino alkylester alkylcarboxylate in which the carbon number of R of alkylcarboxylate portion is smaller than 11 as a lubricant originally have large friction coefficients before aging. In the sample tapes, stick slip easily occurs by aging.

For this reason, it was understood that the lubrication performance of dimethylamino alkylester alkylcarboxylate whose carbon number was set to be a predetermined number was considerably stable.

As is apparent from the above description, dimethylamino alkylester alkylcarboxylate has an excellent lubrication function under severe conditions such as a high-temperature and high-humidity condition or a low-temperature and low-humidity condition, and considerably reduces the friction coefficient of an object to be treated. The lubrication performance of dimethylamino alkylester alkylcarboxylate is sufficiently maintained even after dimethylamino alkylester alkylcarboxylate is held under the high-temperature and high-humidity condition, and is very stable. Therefore, when such dimethylamino alkylester alkylcarboxylate is held in, e.g., the magnetic layer of a magnetic recording medium, a magnetic recording medium which is excellent in abrasion resistance, durability, and travelling performance can be obtained.

What is claimed is:

1. A magnetic recording medium having at least a magnetic layer formed on a nonmagnetic support member, characterized in that dimethylamino alkylester alkylcarboxylate represented by the following formula is coated onto said magnetic layer

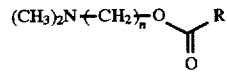

where R is a hydrocarbon group having a carbon number of not less than 11, and n is an integer not more than 10.

2. A magnetic recording medium according to claim 1, characterized in that said magnetic layer is constituted by a metal magnetic thin film, and dimethylamino alkylester alkylcarboxylate is coated on said magnetic layer.

3. A method of reducing a friction coefficient of a magnetic layer, the method comprising the steps of:

providing a magnetic layer; and coating the magnetic film with a lubricant characterized in that the lubricant is dimethylamino alkylester alkylcarboxylate represented by the following formula:

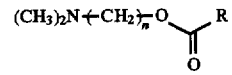

where R is a hydrocarbon group having a carbon number of not less than 11, and n is an integer not more than 10.

4. A magnetic recording medium according to claim 1, characterized in that said magnetic layer is constituted by a magnetic powder and a binder as main components, and dimethylamino alkylester alkylcarboxylate is coated on or added to said magnetic layer.

5. The method of claim 3, wherein the magnetic layer comprises a magnetic thin film.

6. The method of claim 3 wherein the magnetic layer comprises a magnetic powder and a binder.

7. The method of claim 3 wherein the lubricant is coated onto the magnetic layer at a rate of about 5 mg/m².

* * * * *